US009865449B2

(12) United States Patent
Hirrle et al.

(10) Patent No.: US 9,865,449 B2
(45) Date of Patent: Jan. 9, 2018

(54) ILLUMINANT AND ILLUMINANT LAMP COMPRISING SAID ILLUMINANT

(75) Inventors: Renate Hirrle, Augsburg (DE); Armin Konrad, Grossaitingen (DE); Robert Otto, Stadtbergen (DE); Joerg Strauss, Augsburg (DE)

(73) Assignee: LEDVANCE GmbH (DE)

( * ) Notice: Subject to any disclaimer, the term of this patent is extended or adjusted under 35 U.S.C. 154(b) by 0 days.

(21) Appl. No.: 14/235,809

(22) PCT Filed: Jun. 25, 2012

(86) PCT No.: PCT/EP2012/062248
§ 371 (c)(1),
(2), (4) Date: Jan. 29, 2014

(87) PCT Pub. No.: WO2013/017340
PCT Pub. Date: Feb. 7, 2013

(65) Prior Publication Data
US 2014/0191652 A1    Jul. 10, 2014

(30) Foreign Application Priority Data

Jul. 29, 2011 (DE) .................. 20 2011 109 804 U
Mar. 5, 2012 (DE) ........................ 10 2012 203 419

(51) Int. Cl.
| H01J 61/42 | (2006.01) |
| H01J 61/44 | (2006.01) |
| C09K 11/02 | (2006.01) |
| C09K 11/08 | (2006.01) |
| C09K 11/76 | (2006.01) |
| C09K 11/77 | (2006.01) |

(52) U.S. Cl.
CPC ............ *H01J 61/44* (2013.01); *C09K 11/025* (2013.01); *C09K 11/0866* (2013.01); *C09K 11/76* (2013.01); *C09K 11/7726* (2013.01); *C09K 11/7734* (2013.01); *C09K 11/7739* (2013.01); *C09K 11/7769* (2013.01); *C09K 11/7771* (2013.01); *C09K 11/7774* (2013.01); *C09K 11/7777* (2013.01); *C09K 11/7787* (2013.01); *C09K 11/7789* (2013.01); *C09K 11/7794* (2013.01); *C09K 11/7795* (2013.01); *H01J 61/42* (2013.01); *Y10T 428/2991* (2015.01)

(58) Field of Classification Search
CPC .......... H01J 61/42–61/48; C09K 11/02; C09K 11/025
See application file for complete search history.

(56) References Cited

U.S. PATENT DOCUMENTS

| 2,758,941 | A | * | 8/1956 | Crosby .................. C09K 11/02 252/301.4 R |
| 3,569,764 | A | * | 3/1971 | Hanada .................. H01J 61/48 313/487 |
| 4,121,132 | A | | 10/1978 | Repsher |
| 4,393,330 | A | * | 7/1983 | Skwirut et al. |
| 4,585,673 | A | * | 4/1986 | Sigai ........................ 252/301.4 P |
| 4,691,140 | A | * | 9/1987 | Sakakibara et al. .......... 313/486 |
| 5,402,036 | A | * | 3/1995 | Ito ................... 313/487 |
| 5,418,062 | A | * | 5/1995 | Budd ..................... 252/301.6 R |
| 5,433,888 | A | * | 7/1995 | Okada .................. C09K 11/025 252/301.4 R |
| 5,604,396 | A | * | 2/1997 | Watanabe et al. ............. 313/485 |
| 5,714,836 | A | * | 2/1998 | Hunt et al. ..................... 313/487 |
| 5,838,101 | A | | 11/1998 | Pappalardo |
| 6,489,716 | B1 | | 12/2002 | Tews et al. |
| 6,602,617 | B1 | * | 8/2003 | Justel .................... C09K 11/025 252/301.4 P |
| 6,781,302 | B2 | * | 8/2004 | Sigai ........................ H01J 1/63 252/301.4 P |
| 6,794,810 | B2 | | 9/2004 | Gruber et al. |
| 7,651,771 | B2 | | 1/2010 | Meyer et al. |
| 8,519,609 | B2 | | 8/2013 | Winkler et al. |
| 2007/0131906 | A1 | * | 6/2007 | Boilot .................... C09K 11/02 252/301.4 P |
| 2008/0284306 | A1 | * | 11/2008 | Hildenbrand et al. ........ 313/487 |
| 2010/0102704 | A1 | * | 4/2010 | Jermann et al. .............. 313/487 |
| 2012/0037850 | A1 | | 2/2012 | Lee et al. |
| 2012/0093935 | A1 | | 4/2012 | Dembski et al. |
| 2012/0205674 | A1 | | 8/2012 | Lee et al. |

FOREIGN PATENT DOCUMENTS

| CN | 1780895 A | 5/2006 |
| CN | 1780896 A | 5/2006 |
| DE | 69318672 T2 | 2/1999 |
| DE | 19806213 A1 | 8/1999 |
| DE | 10152217 A1 | 4/2003 |
| DE | 60312648 T2 | 11/2007 |
| DE | 102007033026 A1 | 1/2009 |

(Continued)

OTHER PUBLICATIONS

M Doherty et al. "Preparation and characteristics of calcum halophosphates" British Journal of Applied Physics, vol. 6, Supplement 4, 1955.*
Xie Ye, et al., "The surface coating technology of BaMgAl10O17: Eu2+ phosphor", New Chemical Materials, vol. 39, No. 1, Jan. 15, 2011, pp. 21-24.
Cui Hongtao, et al., "Surface Coating of Phosphor", Funtional Materials, vol. 32, No. 1, Dec. 25, 2001, pp. 564-567, 579.
Office Action issued in the corresponding Chinese application No. 201280036661.9 dated Aug. 28, 2014 with its English translation.
Sung-Il Oh et al., "Protective Metal Oxide Coatings on Zinc-sulfide-based Phosphors and their Cathodoluminescence Properties", Bull. Korean Chem. Soc., vol. 31, No. 12, issued 2010, pp. 3723-3729.
E.E. Jay et al., "Partitioning of dopant cations between beta-tricalcium phosphate and fluorapatite", Journal of Nuclear Materials 414, issued 2011, pp. 367-373.

(Continued)

*Primary Examiner* — Mariceli Santiago
(74) *Attorney, Agent, or Firm* — Hayes Soloway PC

(57) ABSTRACT

A phosphor for low-pressure discharge lamps is disclosed, wherein the phosphor is present in the form of phosphor grains coated with a protective layer, wherein the protective layer consists of a metal oxide, a metal borate, a metal phosphate or mixtures thereof.

14 Claims, 1 Drawing Sheet

(56) References Cited

FOREIGN PATENT DOCUMENTS

| | | | |
|---|---|---|---|
| DE | 102007053285 A1 | 5/2009 | |
| DE | 102007058339 A1 | 6/2009 | |
| DE | 102009012698 A1 | 9/2010 | |
| DE | 102010034322 A1 | 2/2012 | |
| EP | 0077077 A2 | 4/1983 | |
| EP | 0100122 A1 | 2/1984 | |
| EP | 0160856 A2 | 11/1985 | |
| EP | 0279254 A2 | 8/1988 | |
| EP | 1473347 A1 | 11/2004 | |
| EP | 1473348 A1 | 11/2004 | |
| GB | 678692 A | 9/1952 | |
| GB | 1191974 A * | 5/1970 | ............. C09K 11/73 |
| JP | 52022583 A | 2/1977 | |
| JP | 52022584 A | 2/1977 | |
| JP | 57051782 A | 3/1982 | |
| JP | 57128780 A | 8/1982 | |
| JP | 57128782 A | 8/1982 | |
| SU | 392573 A1 | 7/1973 | |
| WO | 2004096943 A1 | 11/2004 | |
| WO | 2007082663 A1 | 7/2007 | |
| WO | 2004096944 A1 | 11/2014 | |

OTHER PUBLICATIONS

R. Sankar, "Efficient blue luminescence in Ce3+-activated borates, A6MM'(BO3)6", Solid State Sciences 10, issued 2008, pp. 1864-1874.
English abstract of EP 0077077 A2 dated Apr. 20, 1983.
English abstract of JP 52022584 A dated Feb. 19, 1977.
English abstract of JP52022583 A dated Feb. 19, 1977.
English abstract of JP 5728782 A dated Aug. 10, 1982.
English abstract of JP 57051782 A dated Mar. 26, 1982.
English abstract of JP 57128780 A dated Aug. 10, 1982.
Karsten Koempe et a., "Mit einer Quantenausbeute von 70% gruen lumineszierende CePO4:Tb-Nanopartikel mit einer Shale aus LaPO4", Anfewandte Chemie, issued 2003, pp. 5672-5675.
International Search Report issued in the corresponding PCT application No. PCT/EP2012/062248, dated Nov. 18, 2013.
English abstract of DE 102007058339 A1 dated Jun. 25, 2009.
Search Report issued in the corresponding German application No. 102012203419.6 dated Jan. 9, 2013.
Cui Hong Tao, Zhang Yao Wen, Hong Guang Yan, The surface coating technology of phosphor, Journal of Functional Materials, 2001, pp. 564-567 and 579, China Academic Journal Electronic Publishing House http://www.cnki.net.

* cited by examiner

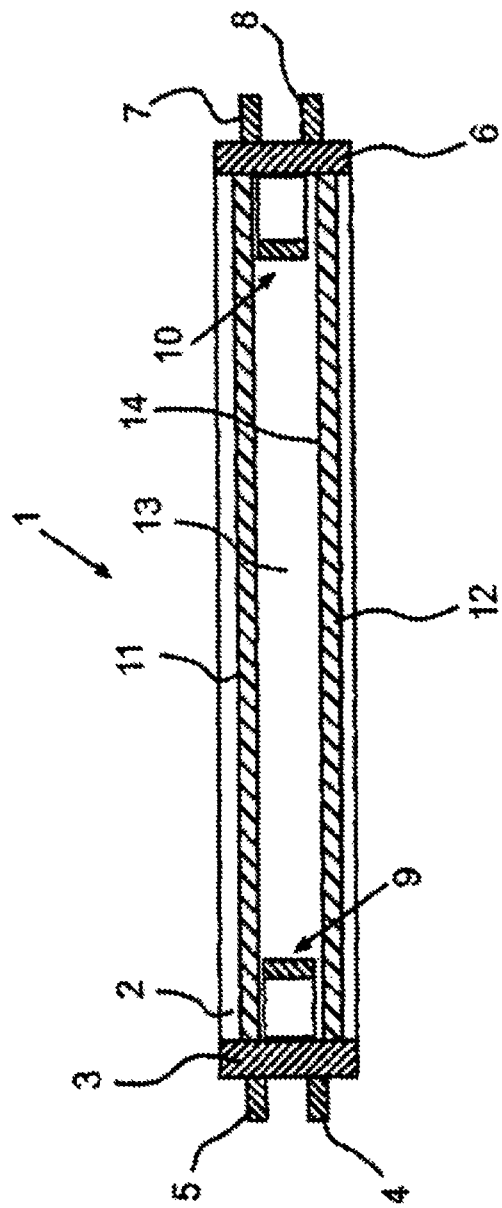
PRIOR ART

ILLUMINANT AND ILLUMINANT LAMP COMPRISING SAID ILLUMINANT

RELATED APPLICATIONS

The present application is a national stage entry according to 35 U.S.C. §371 of PCT application No. PCT/EP2012/062248 filed on Jun. 25, 2012, which claims priority from German application No. 20 2011 109 804.8 filed on Jul. 29, 2011 and German application No. 10 2012 203 419.6 filed on Mar. 5, 2012 and is incorporated herein by reference in its entirety.

TECHNICAL FIELD

The present disclosure relates to a phosphor for a low-pressure discharge lamp, a phosphor composition, and a low-pressure discharge lamp.

BACKGROUND

Regulation EC 245/2009 (amended by regulation 347/2010) prohibits a number of fluorescent lamps having rare-earth-free phosphor coating. Lamps having the same power consumption but significantly higher luminous efficiency and higher luminous flux have been used as a replacement product, with a coating composed of rare earth phosphors being used. The proportion of rare earths is disadvantageous here since rare earths are increasingly running short and their prices on the world market have increased greatly in recent years. Therefore, there is a need for fluorescent lamps having a reduced proportion of rare earths and having the same efficiency and the same luminous flux stability as the fluorescent lamps currently in use, in order thus to reduce the material costs and to reduce environmental burdens resulting from the extraction and transport of rare earths.

In order to reduce the proportion of rare earths, fluorescent lamps have previously been produced in a double-layer design, wherein the lower layer consists of a customary halophosphate phosphor and the top layer consists of a mixture containing rare earth phosphors. Disadvantages of these fluorescent lamps include the high loss of light and the higher Hg consumption over the operating life. The loss of light is caused by radiation damage, in particular hard UV radiation e.g. in the VUV range, of the halophosphate phosphor. The higher Hg consumption can be attributed to the fact that Hg diffuses into the halophosphate phosphor grains.

Another measure for reducing the proportion of rare earths is to produce fluorescent lamps in a reflector layer design. In this case, the inner side of the discharge vessel is coated with an $Al_2O_3$ protective layer and a top layer containing rare earth phosphors is applied thereabove. Disadvantages in this case include the higher proportion of rare earth phosphors compared with the double-layer design and less covering of the ends of the lamp bulbs as a consequence of layer thickness fluctuations over the lamp bulb length.

SUMMARY

Various embodiments provide a phosphor and a phosphor composition for low-pressure discharge lamps, and a low-pressure discharge lamp including such a phosphor composition, which fulfill this requirement by having a reduced proportion of rare earths with the same efficiency and the same luminous flux stability.

The disclosure is based on the inventors' discovery that, by coating phosphor grains with a protective layer, it is possible to improve the stability of the phosphor and thereby to maintain the luminous efficiency for longer. As a result of this coating of the phosphors/phosphor grains of the phosphor composition, the use in fluorescent and compact fluorescent lamps can make a positive contribution with regard to stability toward exciting radiation, with regard to low affinity for Hg and thus low adsorption of Hg during lamp operation, and with regard to stability in water, in order that the environmentally friendly coating methods that are customary nowadays and make use of water-based suspensions can be used. This protective layer surrounding the phosphor grains is embodied as a layer that is as thin and dense as possible and differs in its composition from the composition inside the phosphor grain.

In a first aspect, however, the disclosure relates to a phosphor for low-pressure discharge lamps, wherein the phosphor is present in the form of phosphor grains coated with a protective layer. In this case, the protective layer consists of a metal oxide, a metal borate, a metal phosphate or mixtures thereof.

In various embodiments, the protective layer is applied to the surface of the phosphor grains and covers the latter completely.

The terms "protective layer" or "coating" are used interchangeably herein and relate to a layer or a film that coats the surface of the phosphor grains. Preferably, the entire surface of the phosphor grain is coated. In various embodiments, the layer thickness of the protective layer is approximately 10 nm to 1 μm.

"Phosphor grain", as used herein, relates to a particle composed of one or more phosphors. The particle can be a substantially spherical particle. The term includes crystallites, agglomerates, amorphous particles, etc.

In various embodiments of the disclosure, the protective layer contains $Al_2O_3$, $Y_2O_3$, $La_2O_3$, a metal borate, a metal phosphate, or mixtures thereof, wherein the metal is selected from Sc, Y, La, Gd, Lu, Al, Ce, Mg, Ca, Sr, Ba and mixtures thereof. In specific embodiments, the protective layer substantially or completely consists of the abovementioned materials.

The metal borate or metal phosphate can be a binary metal borate or metal phosphate of the formula $MePO_4$ or $MeBO_3$, wherein Me is selected from Sc, Y, La, Gd, Lu and Al. The metal borate or metal phosphate can likewise be a ternary metal borate or metal phosphate of the formula $(Me^1_{1-x}Me^2_x)PO_4$ or $(Me^1_{1-x}Me^2_x)BO_3$, wherein $Me^1$ and $Me^2$ are selected independently of one another from Sc, Y, La, Gd, Lu and Al.

In various embodiments of the disclosure, the phosphor is a halophosphate phosphor. "Halophosphate phosphor" as used herein, is understood to mean phosphors that are halogen-containing phosphates, in particular of metals, such as strontium, calcium, barium and magnesium, for example. In particular fluorine (F) and chlorine (Cl) are used as "halogen". Exemplary halophosphate phosphors include, but are not restricted to $Ca_{10}(PO_4)_6(F,Cl)_2$:Sb,Mn; $Ca_{10}(PO_4)_6F_2$:Sb,Mn; $Sr_5(PO_4)_3F$:Sb; $Ca_5(PO_4)_3F$:Sb; $3Ca_3(PO_4)_2.Ca(F,Cl)_2$:Mn,Sb; and $3Sr_3(PO_4)_2.Sr(F,Cl)_2$:Mn,Sb. "Halophosphate phosphors" within the meaning of the invention are substantially free of rare earths, i.e. they neither contain rare earth compounds nor are they doped with rare earths. Therefore, in various embodiments, the content of rare earths relative to the coated halophosphate phosphor is <0.1% by weight, preferably <0.05% by weight, even more preferably <0.01% by weight. In various embodiments of the phosphor compositions of the invention, mixtures of two or more halophosphate phosphors can be used. The use of coated halophosphate phosphors in low-pressure discharge lamps allows the layer thickness of the rare-earth-containing tri-band phosphors to be reduced, since the non-absorbed UV radiation is converted into visible light by the halophosphate phosphor. By virtue of the stabilizing coating, furthermore, halophosphate phosphors can be used for certain spectral ranges. In this regard, by way of example, bluish halophosphate phosphors can partly replace the blue phosphor $BaMgAl_{10}O_{17}$:Eu.

In various other embodiments of the disclosure, the phosphor is a rare earth phosphor. "Rare earth phosphors" within the meaning of the invention denote phosphors which contain elements of the rare earths either as the basis or as a doping element. "Rare earth metals" or "rare earths", as used herein, include the following elements: scandium (Sc), yttrium (Y), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb) and lutetium (Lu). The term "rare earth phosphors", as used herein, likewise includes halophosphates of rare earths or halophosphates of other elements doped with rare earths. Exemplary rare earth phosphors include, but are not restricted to, $LaPO_4$:Ce,Tb; $Y_2O_3$:Eu; $BaMgAl_{10}O_{17}$:Eu; $BaMg_2Al_{16}O_{27}$:Eu,Mn; $Y_2O_2S$:Eu; $Y_2O_2S$:Tb; $Y_2O_3$:Tb; $Y_2SiO_5$:Ce; $Y_2SiO_5$:Tb; $Y_3Al_5O_{12}$:Ce; $Gd(Zn,Mg)B_5O_{10}$:Ce,Mn; $Gd_2O_2S$:Eu; $Gd_2O_2S$:Tb, $Gd_2O_2S:_{Pr}$; CeMg—$Al_{11}O_{19}$:Tb; (Ce,Tb)$MgAl_{11}O_{19}$:Ce,Tb; $Sr_4Al_{14}O_{25}$:Eu; $Sr_{10}(PO_4)_6Cl_2$:Eu; (Sr,Ca)$_{10}(PO_4)_6Cl_2$:Eu; (Sr,Ca,Ba)$_{10}(PO_4)_6Cl_2$:Eu $Y_3(Al,Ca)_5O_{12}$:Ce; $Y_3(Al,Ca)_5O_{12}$:Tb; $YAlO_3$:Ce; and $Y(P,V)O_4$:Eu. In phosphors doped with rare earths, the content of rare earths relative to the phosphor in various embodiments is >0.1% by weight, preferably >0.5% by weight, even more preferably >1% by weight. In various embodiments of the invention, mixtures of two or more rare earth phosphors can be used.

In specific embodiments of the disclosure, the rare earth phosphor coated with a protective layer is a phosphor which emits in the blue wavelength range, such as $BaMgAl_{10}O_{17}$:Eu, for example. The stability, in particular of rare-earth-containing blue phosphors, can be improved by this coating.

The phosphor is preferably present in the form of phosphor grains. In various embodiments, said phosphor grains have an average diameter of <25 µm, preferably <10 µm, even more preferably <8 µm. The particle size distribution can be substantially monodisperse. Methods for producing phosphor grains are known in the prior art.

The protective layer can be applied to the phosphor grains by means of a variety of methods. Suitable methods include, but are not restricted to, chemical vapor deposition (CVD) or wet-chemical methods. Corresponding coating methods are known in the prior art.

In a further aspect, the disclosure relates to phosphor compositions containing at least one phosphor according to the invention. In one embodiment, the phosphor composition contains a halophosphate phosphor according to the invention or consists thereof. In further embodiments, the phosphor composition can additionally contain a rare earth phosphor. The latter can likewise be present in the form of phosphor grains coated with a protective layer according to the invention.

"Phosphor composition", as used herein, is understood to mean, in particular, the composition of all phosphors present in a phosphor layer in the discharge vessel of a low-pressure discharge lamp.

In one embodiment of the disclosure, the phosphor composition contains a coated halophosphate phosphor, for example selected from the list mentioned above, and a rare earth phosphor which emits in the blue wavelength range and which can likewise be coated, such as, for example, $BaMgAl_{10}O_{17}$:Eu.

In yet another aspect, the disclosure relates to a low-pressure discharge lamp including a discharge vessel filled with a filling gas composition, and including—applied on the inner side of said discharge vessel—a multilayered phosphor coating including a phosphor layer (lower layer) facing the inner side of the discharge vessel and a phosphor layer (top layer) facing the discharge space, wherein the phosphor layer facing the inner side of the discharge vessel contains or consists of a phosphor composition according to the disclosure.

In various embodiments of the disclosure, the phosphor layer facing the discharge space contains at least one rare earth phosphor. The latter can be selected from the group consisting of: $LaPO_4$:Ce,Tb; $Y_2O_3$:Eu; $BaMgAl_{10}O_{17}$:Eu; $BaMg_2Al_{16}O_{27}$:Eu,Mn; $Y_2O_2S$:Eu; $Y_2O_2S$:Tb; $Y_2O_5$:Tb; $Y_2SiO_5$:Ce; $Y_2SiO_5$:Tb; $Y_3Al_5O_{12}$:Ce; $Gd(Zn,Mg)B_5O_{10}$:Ce,Mn; $Gd_2O_2S$:Eu; $Gd_2O_2S$:Tb, $Gd_2O_2S$:Pr; $CeMgAl_{11}O_{19}$:Tb; (Ce,Tb)$MgAl_{11}O_{19}$:Ce,Tb; $Sr_4Al_{14}O_{25}$:Eu; $Sr_{10}(PO_4)_6Cl_2$:Eu; (Sr,Ca)$_{10}(PO_4)_6Cl_2$:Eu; (Sr,Ca,Ba)$_{10}(PO_4)_6Cl_2$:EU $Y_3(Al,Ca)_5O_{12}$:Ce; $Y_3(Al,Ca)_5O_{12}$:Tb; $YAlO_3$:Ce; and $Y(P,V)O_4$:Eu.

In one embodiment of the disclosure, the phosphor layer facing the discharge space also contains a phosphor composition according to the invention. Preferably, said phosphor layer contains at least one rare earth phosphor according to the disclosure.

In various embodiments, the phosphor composition facing the discharge space contains at least 3 rare earth phosphors, wherein the latter include a phosphor which emits in the red wavelength range, a phosphor which emits in the green wavelength range and a phosphor which emits in the blue wavelength range. Alternatively, the phosphor composition facing the discharge space may include at least 4 rare earth phosphors, wherein the latter include a phosphor which emits in the red wavelength range, a phosphor which emits in the green wavelength range, a phosphor which emits in the blue wavelength range and a phosphor which emits in the blue-green wavelength range. The phosphor which emits in the red wavelength range can be, for example, $Gd(Zn,Mg)B_5O_{10}$:Ce,Mn or $Y_2O_3$:Eu. The phosphor which emits in the green wavelength range can be, for example, $LaPO_4$:Ce,Tb or CeMg—$Al_{11}O_{19}$:Tb. The phosphor which emits in the blue wavelength range can be, for example, $BaMgAl_{10}O_{17}$:Eu or $Sr_{10}(PO_4)_6Cl_2$:Eu. The phosphor which emits in the blue-green wavelength range can be, for example, $Sr_4Al_{14}O_{25}$:Eu or $BaMg_2Al_{16}O_{27}$:Eu,Mn. These rare earth phosphors can be coated phosphors according to the disclosure or else uncoated phosphors.

The production of low-pressure discharge lamps including corresponding phosphor layers is known in the prior art. For the production of the low-pressure discharge lamps of the present invention, the coated phosphors are used as powder for the production of an aqueous phosphor suspension, which is then applied to the inner side of the discharge vessel by means of known methods.

In various embodiments, the low-pressure discharge lamp furthermore includes a protective layer arranged between the inner side of the discharge vessel and the phosphor layer facing the inner side of the discharge vessel. Said protective layer may include of $Al_2O_3$, $Y_2O_3$, $La_2O_3$, a metal borate, a metal phosphate, or mixtures thereof, wherein the metal consists of Sc, Y, La, Gd, Lu, Al, Ce, Mg, Ca, Sr, Ba and mixtures thereof. As a result, diffusion of the mercury present in the discharge vessel, into the material of the discharge vessel usually glass, and associated blackening thereof can be effectively prevented.

In various embodiments of the disclosure, the low-pressure discharge lamps of the invention contain a filling gas, which is a noble gas or a mixture of noble gases. In one embodiment, the filling gas is a filling gas composition consisting of argon and/or krypton.

The low-pressure discharge lamp of the disclosure can be an Hg low-pressure discharge lamp. The Hg low-pressure discharge lamp can be, for example, a compact fluorescent lamp (energy-saving lamp). In various embodiments, the phosphor composition according to the invention is used in a rod-shaped low-pressure discharge lamp, for example of the design T8 L36W.

Low-pressure discharge lamps are well known in the art as described in U.S. Patent Publication 2010/0102704, which is reproduced here as a non-limiting embodiment thereof. FIG. 1 shows a schematic sectional representation of a discharge lamp 1, which is designed as a low-pressure discharge lamp. The discharge lamp 1 has a linear design and comprises a tubular discharge vessel 2, which is a glass bulb. A cap 3, which has electrical contacts 4 and 5 extending outward, is fitted on one end of the discharge vessel 2. A cap 6, to which outwardly extending contacts 7 and 8 are fastened, is likewise arranged on the opposite side of the discharge vessel 2. These electrical contacts 7 and 8 are electrically connected via electrical leads to an electrode 10, which extends into the discharge space 13 of the discharge vessel 2. Correspondingly, the electrical contacts 4 and 5 are connected to electrical leads which are connected to another electrode 9, this electrode 9 also extending into the discharge space 13 of the discharge vessel 2.

The term Hg source is intended in particular to mean Hg atoms and Hg ions in the discharge space 13, which emit in particular the UV radiation by electron excitation.

A phosphor layer 12 is formed on an inner side 11 of the discharge vessel 2, and in the exemplary embodiment, the phosphor layer 12 extends over the entire length of the discharge vessel 2. The phosphor layer 12 in the exemplary embodiment is formed directly on the inner side 11. Only the phosphor layer 12 is represented in the embodiment shown, although another layer may also be formed on the upper side 14 facing toward the discharge space 13 and therefore on the upper side 14 facing away from the inner side of the discharge vessel 2. This may for example be a protective layer.

Another phosphor layer may likewise be formed on this upper side 14. Another layer may likewise be arranged and formed between the phosphor layer 12 and the inner side 11.

The phosphor compounds are enclosed by a protective layer of metal oxides, a borate, a phosphate or a ternary material.

"Approximately", as used herein in connection with numerical values, includes a variation of up to ±10%, preferably ±5%.

All chemical formulae indicated for the phosphor mixture and the phosphor compounds are indicated as ideal forms, but the intention is for the invention alternatively also to explicitly encompass all compounds going beyond these ideal formulae and having slight deviations from stoichiometry. That applies, in particular, to deviations for which the crystal structure remains unchanged and the deviations in emission and absorption spectra differ by less than 1% in the peak position and by less than 5% in the peak width.

In a further aspect, the disclosure relates to the use of the phosphors and phosphor compositions according to the invention as phosphor coating in a low-pressure discharge lamp.

The disclosure is described herein by reference to specific embodiments, but is not restricted thereto. In particular, it is readily apparent to a person skilled in the art that various amendments to the invention described can be made, without departing from the meaning and scope of the invention as by the appended patent claims. The scope of the invention is thus determined by the patent claims and the intention is for the invention to encompass all modifications and amendments which fall within the scope of interpretation and equivalence of the claims.

The invention claimed is:

1. A phosphor for low-pressure discharge lamps,
    wherein the phosphor is present in the form of phosphor grains coated with a protective layer, wherein the protective layer consists of a metal borate, a metal phosphate or mixtures thereof;
    wherein the metal borate or metal phosphate is a binary metal borate or metal phosphate of the formula $MePO_4$ or $MeBO_3$, wherein Me is selected from Sc, Y, La, Gd, and Lu; or
    the metal borate or metal phosphate is a ternary metal borate or metal phosphate of the formula or $(Me^1_{1-x}Me^2_x)PO_4$ or $(Me^1_{1-x}Me^2_x)BO_3$, wherein $Me^1$ and $Me^2$ are selected independently of one another from Sc, Y, La, Gd, and Lu;
    wherein the phosphor comprises rare earth compounds in an amount less than about 0.1% by weight.

2. The phosphor as claimed in claim 1,
    wherein the plurality of phosphors are phosphor is selected from the group consisting of: $Ca_{10}(PO_4)_6(F,Cl)_2$:Sb,Mn; $Ca_{10}(PO_4)_6F_2$:Sb,Mn; $Sr_5(PO_4)_3F$:Sb; $Ca_5(PO_4)_3F$:Sb; $3Ca_3(PO_4)_2.Ca(F,Cl)_2$:Mn,Sb; and $3Sr_3(PO_4)_2.Sr(F,Cl)_2$:Mn,Sb.

3. The phosphor as claimed in claim 1, wherein the protective layer is applied to the phosphor grains by means of chemical vapor deposition (CVD) or by means of wet-chemical methods.

4. The phosphor as claimed in claim 1, wherein the phosphor has an average grain size of less than 10 μm.

5. A composition of phosphors for low-pressure discharge lamps, wherein the composition of phosphors comprises at least one halophosphate phosphor comprising rare earth compounds in an amount less than about 0.1% by weight, wherein the at least one halophosphate phosphor is present in the form of phosphor grains coated with a protective layer, wherein the protective layer consists of a metal borate, a metal phosphate or mixtures thereof;
    wherein the metal borate or metal phosphate is a binary metal borate or metal phosphate of the formula $MePO_4$ or $MeBO_3$, wherein Me is selected from Sc, Y, La, Gd, and Lu; or
    the metal borate or metal phosphate is a ternary metal borate or metal phosphate of the formula or $(Me^1_{1-x}Me^2_x)PO_4$ or $(Me^1_{1-x}Me^2_x)BO_3$, wherein $Me^1$ and $Me^2$ are selected independently of one another from Sc, Y, La, Gd, and Lu.

6. The composition of phosphors as claimed in claim 5, wherein the at least one halophosphate phosphor is selected from the group consisting of: $Ca_{10}(PO_4)_6(F,Cl)_2$:Sb,Mn; $Ca_{10}(PO_4)_6F_2$:Sb,Mn; $Sr_5(PO_4)_3F$:Sb; $Ca_5(PO_4)_3F$:Sb; $3Ca_3(PO_4)_2.Ca(F,Cl)_2$:Mn,Sb; and $3Sr_3(PO_4)_2.Sr(F,Cl)_2$:Mn,Sb.

7. A low-pressure discharge lamp comprising a discharge vessel filled with a filling gas composition, and comprising a multilayered phosphor coating comprising a phosphor layer facing the inner side of the discharge vessel and a phosphor layer facing the discharge space, wherein the phosphor layer facing the inner side of the discharge vessel and/or the phosphor layer facing the discharge space contains a composition, wherein the composition within the phosphor layer facing the inner side comprises at least one halophosphate phosphor, wherein the at least one halophosphate phosphor is present in the form of phosphor grains coated with a protective layer, wherein the protective layer consists of a metal borate, a metal phosphate or mixtures thereof; wherein the metal borate or metal phosphate is a binary metal borate or metal phosphate of the formula $MePO_4$ or $MeBO_3$, wherein Me is selected from Sc, Y, La, Gd, and Lu; or the metal borate or metal phosphate is a ternary metal borate or metal phosphate of the formula $(Me^1_{1-x}Me^2_x)PO_4$ or $(Me^1_{1-x}Me^2_x)BO_3$, wherein $Me^1$ and $Me^2$ are selected independently of one another from Sc, Y, La, Gd, and Lu.

8. The low-pressure discharge lamp as claimed in claim 7, wherein the phosphor layer facing the discharge space contains at least one rare earth phosphor.

9. The low-pressure discharge lamp as claimed in claim 8, wherein the at least one rare earth phosphor is selected from the group consisting of: $LaPO_4$:Ce,Tb; $Y_2O_3$:Eu; $BaMgAl_{10}O_{17}$:Eu; $BaMg_2Al_{16}O_{27}$:Eu,Mn; $Y_2O_2S$:Eu; $Y_2O_2S$:Tb; $Y_2O_5$:Tb; $Y_2SiO_5$:Ce; $Y_2SiO_5$:Tb; $Y_3Al_5O_{12}$:Ce; $Gd(Zn,Mg)B_5O_{10}$:Ce,Mn; $Gd_2O_2S$:Eu; $Gd_2O_2S$:Tb; $Gd_2O_2S$:Pr; $CeMgAl_{11}O_{19}$:Tb; $(Ce,Tb)MgAl_{11}O_{19}$:Ce,Tb; $Sr_4Al_{14}O_{25}$:Eu; $Sr_{10}(PO_4)_6Cl_2$:Eu; $(Sr,Ca)_{10}(PO_4)_6Cl_2$:Eu; $(Sr,Ca,Ba)_{10}(PO_4)_6Cl_2$:Eu; $Y_3(Al,Ca)_5O_{12}$:Ce; $Y_3(Al,Ca)_5O_{12}$:Tb; $YAlO_3$:Ce; and $Y(P,V)O_4$:Eu.

10. The low-pressure discharge lamp as claimed in claim 7, wherein the phosphor composition facing the discharge space contains at least 3 rare earth phosphors, wherein the latter comprises a phosphor which emits in the red wavelength range, a phosphor which emits in the green wavelength range and a phosphor which emits in the blue wavelength range; or the phosphor composition facing the discharge space contains at least 4 rare earth phosphors, wherein the latter comprise a phosphor which emits in the red wavelength range, a phosphor which emits in the green wavelength range, a phosphor which emits in the blue wavelength range and a phosphor which emits in the blue-green wavelength range.

11. The low-pressure discharge lamp as claimed in claim 7, wherein the low-pressure discharge lamp further comprises a protective layer arranged between the inner side of the discharge vessel and the phosphor layer facing the inner side of the discharge vessel.

12. The low-pressure discharge lamp as claimed in claim 11, wherein the protective layer consists of a metal oxide, metal borate, a metal phosphate, or mixtures thereof.

13. The low-pressure discharge lamp as claimed in claim 7, wherein the filling gas composition comprises argon or krypton.

14. The low-pressure discharge lamp as claimed in claim 7, wherein the phosphor layer facing the discharge space contains at least one phosphor selected from the group consisting of: $Ca_{10}(PO_4)_6(F,Cl)_2$:Sb,Mn; $Ca_{10}(PO_4)_6F_2$:Sb,Mn; $Sr_5(PO_4)_3F$:Sb; $3Ca_3(PO_4)_2.Ca(F,Cl)_2$:Mn,Sb; and $3Sr_3(PO_4)_2.Sr(F,Cl)_2$:Mn,Sb.

* * * * *

UNITED STATES PATENT AND TRADEMARK OFFICE
CERTIFICATE OF CORRECTION

PATENT NO. : 9,865,449 B2
APPLICATION NO. : 14/235809
DATED : January 9, 2018
INVENTOR(S) : Hirrle et al.

Page 1 of 1

It is certified that error appears in the above-identified patent and that said Letters Patent is hereby corrected as shown below:

In the Claims

At Column 6, Lines 33-34, in Issued Claim 2:
"wherein the plurality of phosphors are phosphor is"
Should be:
"wherein the phosphor is"

Signed and Sealed this
Seventh Day of August, 2018

Andrei Iancu
*Director of the United States Patent and Trademark Office*